(12) United States Patent
Vandermeiren

(10) Patent No.: US 7,151,081 B2
(45) Date of Patent: Dec. 19, 2006

(54) LOW AROMATICS COMPOSITION

(76) Inventor: Herman Vandermeiren, Popperodedries, 51, B9300 Aalst (BE)

( * ) Notice: Subject to any disclaimer, the term of this patent is extended or adjusted under 35 U.S.C. 154(b) by 254 days.

(21) Appl. No.: 10/456,118

(22) Filed: Jun. 6, 2003

(65) Prior Publication Data

US 2003/0207783 A1    Nov. 6, 2003

Related U.S. Application Data

(63) Continuation of application No. 09/743,072, filed on Apr. 16, 2001, now abandoned.

(51) Int. Cl.
*C11D 7/50* (2006.01)
(52) U.S. Cl. .................. 510/407; 510/365; 510/417
(58) Field of Classification Search ............... 510/421, 510/201, 202, 407, 365; 44/418, 385, 386
See application file for complete search history.

(56) References Cited

U.S. PATENT DOCUMENTS

| | | | | |
|---|---|---|---|---|
| 4,920,691 A | * | 5/1990 | Fainman | 44/389 |
| 5,062,988 A | * | 11/1991 | Dishart et al. | 510/175 |
| 6,017,369 A | * | 1/2000 | Ahmed | 44/302 |
| 6,353,143 B1 | * | 3/2002 | Fang et al. | 585/1 |
| 6,495,074 B1 | * | 12/2002 | Carr | 264/36.18 |

* cited by examiner

*Primary Examiner*—Gregory Webb

(57) ABSTRACT

Provided is a composition comprising:
(a) a hydrocarbon component; and
(b) an ester component;
wherein the composition has:
(i) less than 13% vol. of aromatic compounds relative to the total volume of the composition;
(ii) a distillation range situated within the range 135–260° C.; and
(iii) a Kauri butanol value of 34 or more.

11 Claims, No Drawings

LOW AROMATICS COMPOSITION

This application is a continuation of U.S. application Ser. No. 09/743,072, filed Apr. 16th, 2001, now abandoned.

FIELD OF THE INVENTION

The present invention relates to a solvent composition, which has a low aromatic content making it beneficial from an environmental and health viewpoint, but which has excellent solvency characteristics. The invention also relates to a process for producing the solvent and uses of the solvent. The solvent composition is particularly useful as a replacement for white spirit.

BACKGROUND TO THE INVENTION

The use of solvents having a high aromatic content (such as white spirits) has been known for some considerable time in a great number of applications where good solvency characteristics are required (see "Directory of solvents", Edited by B. P. Whim and P. G. Johnson, Blackie Academic and Professional).

However, solvents having a high aromatic content, although affording good solvency, are disadvantageous from a health and environmental viewpoint. For instance, volatile organic components (VOCs) containing aromatics that are emitted when using solvents such as white spirit are responsible for the increased creation of ozone in the troposphere, when compared for example to saturated products (see "Photochemical ozone creation potentials for a large number of reactive hydrocarbons under European conditions", R. G. Derwent, M. E. Jenkin and S. M. Saunders, *Atmospheric Environment*, Vol. 30, No. 2, 181–199, 1996). In addition, aromatic-containing compounds and ozone are poisonous. Thus, high-aromatic solvents are hazardous to the health of the user and can be damaging to the environment. According to the European Chemical Industrial Council (CEFIC) scheme for environmental classification of solvents, some white spirit grades are classified as dangerous for the environment. The POCPs (Photochemical Ozone Creation Potentials) of the aromatic compounds in white spirit are higher than the POCPs of aliphatic hydrocarbons and esters (see "Photochemical ozone creation potentials for a large number of reactive hydrocarbons under European conditions", R. G. Derwent, M. E. Jenkin and S. M. Saunders, *Atmospheric Environment*, Vol. 30, No. 2, 181–199, 1996). However, solvents having a lower content of aromatics are considered to be less detrimental to health and environment.

It is thus desirable to use solvents that do not contain aromatic compounds, or have a low aromatic content. Such solvents have been proposed in the past (see "Directory of solvents", Edited by B. P. Whim and P. G. Johnson, Blackie Academic and Professional). Hydrocarbons having an aromatic content of less than 1% vol. are not classified as dangerous under the CEFIC classification and they show POCP values lower than aromatics, as indicated above. FR 2511019A discloses a diluent comprising a mixture of white spirit with less than 5% aromatics and another solvent. EP 0495348A describes a composition for removing the protective coating from new cars, containing isoparrafin having not more than 0.5 wt % of aromatics. However, although the volatility of such solvents is similar to that of white spirits, there is a problem with such solvents, since they have a low solvency power. The use of such solvents is thus limited.

It is known that the solvency power of ester compounds is high (see C. Nielsen, "Vegetable esters—cleaning agents in the paint and ink industry", presentation by C. Nielsen, Institute Maurice, Brussels-Anderlecht, Belgium 1999; and "Metal cleaning and degreasing with vegetable-based fatty acid esters", Demi Theodori/Chemiewinkel, University of Amsterdam). WO 91/06690 describes a mixture for cleaning printed circuit boards containing aliphatic hydrocarbons and organic compounds with polar groups, such as esters. JP 05 098297 discloses a detergent comprising 20–90% hydrocarbon, 5–50% ester and 5–40% surfactant. In addition, esters generally do not contain harmful aromatics and VOCs and therefore are not classified as compounds dangerous to the environment or health. However, whilst the solvency power of esters is high, they have low volatility. This characteristic limits their use as solvents, because they have very long evaporation times making them impractical for many purposes. For example, when esters are used as solvents for some paint applications, the paint will take far too long to dry and may in fact remain sticky.

SUMMARY OF THE INVENTION

The present invention aims to overcome the disadvantages associated with the above known solvent compositions. Accordingly, the present invention provides a composition comprising:
  (a) a hydrocarbon component; and
  (b) an ester component;

wherein the composition has:
  (i) less than 13% vol. of aromatic compounds relative to the total volume of the composition;
  (ii) a distillation range situated within the range 135–260° C.; and
  (iii) a Kauri butanol value of 34 or more.

The present invention also provides a process for the production of a composition as defined above, which process comprises mixing the hydrocarbon component with the ester component.

Further provided by the present invention is a coating composition, comprising a composition as defined above as a solvent, and a cleaning composition comprising a composition as defined above as a solvent.

Using the present composition, a product is provided which comprises a lower quantity of aromatic compounds, giving the product benefits for health and environment (the present composition has less aromatics and lower POCP values than previous compositions). However, despite this, the composition's volatility and solvency properties are excellent.

The composition of the present invention has a wide variety of uses, in particular as a solvent (especially as a substitute for white spirit), including as a solvent for coating compositions such as paint, varnish, lacquer, sealing and staining compositions. The present composition is also useful in cleaning compositions such as metal cleaning compositions, and as a solvent for adhesives. The present composition may also be used as a solvent for alkyd resins, as a diluent for plastisol and as a solvent for use in the printing industry.

DESCRIPTION OF THE PREFERRED EMBODIMENTS

The ester content of the present composition is not particularly limited, provided that the composition retains its distillation and solvency characteristics. However, typically the present composition contains 50% vol. or less of the ester component. Preferably the composition contains from 1–10% vol. of the ester component. More preferably the composition contains from 1–4% vol. of the ester component.

The present composition contains less than 13% vol. of aromatic compounds, as measured according to ASTM D 1319. Typically, the present composition contains 10% vol. or less of aromatics, more preferably 5% vol. or less of aromatics and most preferably 1% vol. or less of aromatics.

The distillation range of the present composition is situated within the range 135–260° C., as measured according to ASTM D 86. The distillation range is defined by an initial boiling point and a final boiling point and is a measure of the volatility of the composition as a whole. It is intended by the term "situated within" that the range is inclusive of the two boundary values, such that the initial boiling point of the composition may be as low as 135° C. and the final boiling point of the composition may be as high as 260° C. The wide distillation range results from the differing boiling points of the individual chemical components of the composition. In a preferred embodiment, the distillation range of the composition is situated within the range 145–240° C.

The present composition has a solvency power, as measured by its Kauri butanol value, of 34 or more. The Kauri butanol value is the volume, at 25° C., of solvent, corrected to a defined standard, required to produce a defined degree of turbidity when added to 20 g of a standard solution of Kauri resin in normal butyl alcohol. A high value indicates relatively strong solvency power. In the present invention, the Kauri butanol value was measured according to ASTM D 1133. Typically, the present composition has a Kauri butanol value of 35 or more and preferably of 38 or more.

The flashpoint of the present composition is not particularly limited, provided that the composition meets the safety requirements of the particular application to which it is to be put. However, in a preferred embodiment, the present composition has a flashpoint of 38° C. or more as measured according to ASTM D 93, preferably 40° C. or more.

The evaporation rate of the present compositions is not particularly limited, provided that the compositions have the distillation range and solvency power required according to the present invention. The evaporation rate is the ratio between the evaporation time of the solvent in question to the evaporation time of diethylether. It is preferred that the present composition has an evaporation rate of 250 or less (diethylether=1), as measured according to DIN 53170. Typically, the present composition has an evaporation rate of 60 or less, more preferably 55 or less.

The hydrocarbon content of the present composition is not particularly limited, provided that the composition retains its distillation and solvency characteristics. However, the present composition typically contains 50% vol. or more of the hydrocarbon component. Preferably the composition contains from 91–99% vol. of the hydrocarbon component. More preferably the composition contains from 96–99% vol. of the hydrocarbon component.

The hydrocarbon component of the present composition may comprise one or more individual hydrocarbons, or alternatively may comprise a hydrocarbon cut. By "hydrocarbon cut" is meant a cut from a cracking procedure, which cut comprises hydrocarbons. Typically the hydrocarbon cut has a distillation range situated within the range 135–260° C., and preferably a distillation range situated within the range 145–240° C. More preferably, the hydrocarbon cut has a distillation range situated within the range 140–190° C., 145–220° C., 185–215° C. or 190–220° C. In preferred embodimen present invention, the hydrocarbon cut may comprise white spirit, n-paraffin, isoparaffin and/or kerosene.

The aromatic content of the hydrocarbon component is not particularly limited, provided that the aromatic content of the final composition remains below 13% vol. However, it is preferred that the aromatic content of the hydrocarbon component is less than 13% vol., preferably 10% vol. or less, more preferably 5% vol. or less and most preferably 1% vol. or less. In one embodiment of the present invention, the hydrocarbon component is a de-aromatised hydrocarbon component, such as a de-aromatised hydrocarbon cut. By de-aromatised it is meant that the hydrocarbon component has undergone a treatment to reduce its content of aromatic compounds.

The hydrocarbon component can be de-aromatised by any known method. One such method is a hydrotreatment method, commonly used to hydrotreat kerosene. In this method, the hydrocarbon cut is reacted with hydrogen. A stream of hydrogen-rich gas is added to the feedstock, and the combined stream is heated in a reactor feed/effluent exchanger before passing to the reactor charge heater to obtain the temperature required for reaction. The hot feed is passed down through three catalyst beds in a single reactor vessel, where the catalyst promotes the saturation of aromatics with hydrogen. The catalyst employed is platinum on an aluminosilicate support. The reactor effluent is then cooled. After cooling, the effluent passes to the high pressure separator, where the stream separates by flash into vapour and liquid. The liquid product is passed to a stripper column. Light hydrocarbons stripped of in the stripper column are routed to fuel gas. The gasoline is drawn as liquid from the stripper overheads accumulator. The stripper bottoms (final product) are collected.

Typically the hydrocarbon component is a de-sulphurised hydrocarbon component Preferably, the sulphur content of the hydrocarbon component is 5 ppm or less, more preferably 2 ppm or less.

Particularly preferred hydrocarbon components having a low aromatics content for use in the present invention are Finalan® 40 and Finalan® 60, both products of Fina Chemicals, Belgium.

In a preferred embodiment of the present invention, the ester component of the composition comprises an ester of a mono-alcohol having from 6–12 carbon atoms, an ester of a poly-alcohol having from 4–8 carbon atoms, an ester of a hydroxyacid compound, or mixtures thereof. More preferably the ester component comprises methyl caprylate and/or methyl heptanoate.

The distillation range of the ester component is not particularly limited, provided that the distillation range of the final composition remains situated within the range 135–260° C. However, it is preferred that the distillation range of the ester component is situated within the range 135–240° C., more preferably 145–220° C.

The compositions of the present invention generally do not contain surfactant, unlike some known cleaning compositions. Thus the present compositions preferably contain less than 5% by weight of surfactant. More preferably the compositions contain substantially no surfactant.

Embodiments of the present invention will now be described in the following by way of example only.

EXAMPLES

In the following examples, seven blends (a)–(g) of a composition according to the present invention were formulated and compared with white spirit (a product of Fina Chemicals, Belgium). The details of the individual components used to formulate the blends are given below in Table 1.

TABLE 1

| Property | EBS 507[1] (ester) | EBS 508[2] (ester) | EBS 510[3] (ester) | Finalan ® 40 (hydrocarbon) |
|---|---|---|---|---|
| Distillation range (° C.) | 168–194 | 181–188 | 190–235 | 162–197 |
| Flash point (° C.) | >50 | 80 | 82 | >40 |
| Kauri butanol value | 136 | 122 | 107 | 33.7 |

[1]EBS 507 = methyl heptanoate (Radia 30159)
[2]EBS 508 = methyl caprylate (Radia 7984)
[3]EBS 510 = methyl caprylate/caprate blend (Radia 7983)

The following blends, shown below in Table 2, were formulated using the above components.

TABLE 2

| Blend | Ester | Hydrocarbon |
|---|---|---|
| (a) | EBS 510: 10% | Finalan ® 40:90% |
| (b) | EBS 508: 10% | Finalan ® 40: 90% |
| (c) | EBS 508: 7% | Finalan ® 40: 93% |
| (d) | EBS 508: 5% | Finalan ® 40: 95% |
| (e) | EBS 507: 5% | Finalan ® 40: 95% |
| (f) | EBS 507: 3% | Finalan ® 40: 97% |
| (g) | EBS 507: 2% | Finalan ® 40: 98% |

The properties of the resulting blends are shown below in Table 3.

TABLE 3

| | Appearance | Distillation range (° C.) | Kauri butanol value | Aromatics (% vol.) | Evaporation rate |
|---|---|---|---|---|---|
| Blend (a) | Slightly turbid: C & B[1] after 2 hr at room temperature | 163–215 | 39.5 | <1 | — |
| Blend (b) | Slightly turbid: C & B after 2 hrs at room temperature | 164–196 | 40.1 | <1 | 55 |
| Blend (c) | C & B | — | 38.1 | <1 | — |
| Blend (d) | C & B | 163–198 | 36.4 | <1 | 54 |
| Blend (e) | C & B | 162–201 | 36.8 | <1 | 52 |
| Blend (f) | C & B | 162–198 | 35.5 | <1 | 52 |
| Blend (g) | C & B | 163–197 | 35.1 | <1 | 47 |
| White Spirit[2] | C & B | 161–186 | 37 | 17 | 51 |

[1]C & B = Clear and bright
[2]White spirit from Fina Chemicals, Belgium

From the above example blends, it can be seen that the compositions of the present invention are comparable with, or superior to, conventional white spirit in their solvency properties, despite having significantly lower quantities of aromatic compounds. The present compositions are thus superior to conventional white spirit, since they present a lower risk to health and environment.

The inventions claimed is:

1. A solvent composition comprising
   (a) a hydrocarbon component in an amount within the range of 91–99 vol. % of said composition; and
   (b) an ester component in an amount within the range of 1–4 vol. % of said composition;
   wherein the composition has:
   (c) less than 1 vol. % of aromatic compounds relative to the total volume of the composition measured according to method ASTM D 1319;
      (i) a distillation range situated within the range 135–260° C. measured according to method ASTM D 86; and
      (ii) a Kauri butanol value of 34 or more measured according to method ASTMD 1133
   wherein the hydrocarbon component comprises a de-aromatised hydrocarbon cut selected from the group consisting of white spirit and kerosene and mixtures thereof and wherein the hydrocarbon component has a distillation range situated within the range of 140–190° C., 145–220° C., 185–215° C. or 190–220° C.

2. A composition according to claim 1, which composition has a Kauri butanol value of 35 or more.

3. A composition according to claim 1, which composition has a flashpoint of 38° C. or more.

4. A composition according to claim 1, wherein the ester component comprises an ester of a mono-alcohol having from 6–12 carbon atoms, an ester of a poly-alcohol having from 4–8 carbon atoms, an ester of a hydroxyacid compound, or mixtures thereof.

5. A composition according to claim 4, wherein the ester component comprises methyl caprylate and/or methyl heptanoate.

6. A composition according to claim 1, wherein the ester component has a distillation range situated within the range of 145–220° C.

7. A process for the production of a solvent composition of:
   (a) a hydrocarbon component in an amount within the range of 91–99 vol. % of said composition; and
   (b) an ester component in an amount within the range of 1–4 vol. % of said composition;
   wherein the composition has:
   (c) less than 1 vol. % of aromatic compounds relative to the total volume of the composition measured according to method ASTM D 1319;
      (i) a distillation range situated within the range 135–260° C. measured according to method ASTM D 86; and
      (ii) a Kauri butanol value of 34 or more measured according to method ASTM D 1133 wherein the hydrocarbon component comprises a de-aromatised hydrocarbon cut selected from the group consisting of white spirit and kerosene and mixtures thereof and wherein the hydrocarbon component has a distillation range situated within the range of 140–190° C., 145–220° C., 185–215° C. or 190–220° C. which process comprises mixing the hydrocarbon component with the ester component.

8. A process according to claim 7, further comprising mixing white spirit with the hydrocarbon component and the ester component.

9. A coating composition, comprising a composition of:
(a) a hydrocarbon component in an amount within the range of 91–99 vol. % of said composition; and
(b) an ester component in an amount within the range of 1–4 vol. % of said composition;
wherein the composition has:
(c) less than 1 vol. % of aromatic compounds relative to the total volume of the composition measured according to method ASTM D 1319;
  (i) a distillation range situated within the range 135°–260° C. measured according to method ASTM D 86; and
  (ii) a Kauri butanol value of 34 or more measured according to method ASTM D 1133
wherein the hydrocarbon component comprises a de-aromatised hydrocarbon cut selected from the group consisting of white spirit and kerosene and mixtures thereof and wherein the hydrocarbon component has a distillation range situated within the range of 140–190° C., 145–220° C., 185–215° C. or 190–220° C.

10. A coating composition according to claim 9, which is a paint, a varnish, a sealant, or a staining composition.

11. A cleaning composition comprising a composition of:
(a) a hydrocarbon component in an amount within the range of 91–99 vol. % of said composition; and
(b) an ester component in an amount within the range of 1–4 vol. % of said composition;
wherein the composition has:
(a) less than 1 vol. % of aromatic compounds relative to the total volume of the composition measured according to method ASTM D 1319;
  (i) a distillation range situated within the range 135°–260° C. measured according to method ASTM D 86; and
  (ii) a Kauri butanol value of 34 or more measured according to method ASTM D 1133 as a solvent.
wherein the hydrocarbon component comprises a de-aromatised hydrocarbon cut selected from the group consisting of white spirit and kerosene and mixtures thereof and wherein the hydrocarbon component has a distillation range situated within the range of 140–190° C., 145–220° C., 185–215° C. or 190–220° C.

* * * * *